(12) United States Patent
Davenport et al.

(10) Patent No.: US 7,022,208 B2
(45) Date of Patent: Apr. 4, 2006

(54) METHODS FOR BONDING STRUCTURAL ELEMENTS OF PAPER MACHINE AND INDUSTRIAL FABRICS TO ONE ANOTHER AND FABRICS PRODUCED THEREBY

(75) Inventors: Francis L. Davenport, Ballston Lake, NY (US); Charles E. Kramer, Walpole, MA (US); Joseph G. O'Connor, Hopedale, MA (US); Maurice Paquin, Plainville, MA (US)

(73) Assignee: Albany International Corp., Albany, NY (US)

( * ) Notice: Subject to any disclaimer, the term of this patent is extended or adjusted under 35 U.S.C. 154(b) by 358 days.

(21) Appl. No.: 10/334,249

(22) Filed: Dec. 31, 2002

(65) Prior Publication Data

US 2004/0126546 A1     Jul. 1, 2004

(51) Int. Cl.
*D21F 1/10* (2006.01)
*D21F 7/08* (2006.01)
*D21F 7/12* (2006.01)

(52) U.S. Cl. .................. 162/358.2; 162/348; 162/362; 162/900; 162/902; 162/903; 428/196; 428/198; 428/220; 442/149; 442/218; 442/263; 34/116; 34/123; 156/181; 427/288

(58) Field of Classification Search .............. 162/199, 162/348, 358.1, 358.2, 117, 362, 900, 902, 162/903; 139/383 A, 425 A; 245/10; 28/110, 28/142; 442/218, 220, 149–151, 263; 156/148, 156/91, 92, 180, 181; 428/105–114, 190, 428/343–350, 220, 196–198; 35/95, 111, 35/116, 123; 427/256, 288
See application file for complete search history.

(56) References Cited

U.S. PATENT DOCUMENTS

| 3,042,568 | A | | 7/1962 | Ludowici et al. ........... 156/137 |
| 3,149,003 | A | | 9/1964 | Christie et al. |
| 3,164,514 | A | * | 1/1965 | Day ............................. 245/2 |
| 3,175,792 | A | | 3/1965 | Smallian ....................... 245/8 |
| 3,176,375 | A | * | 4/1965 | Hindle et al. ............... 156/296 |
| 3,313,645 | A | * | 4/1967 | Wagner et al. .............. 428/360 |
| 3,350,260 | A | | 10/1967 | Johnson ...................... 162/116 |
| 3,501,366 | A | | 3/1970 | Bramley et al. |
| 3,549,742 | A | | 12/1970 | Benz |
| 3,613,258 | A | | 10/1971 | Jamieson ...................... 34/95 |
| 3,622,415 | A | * | 11/1971 | Kunsman ..................... 156/158 |
| 3,673,023 | A | | 6/1972 | Ross ........................... 156/137 |
| 3,720,578 | A | | 3/1973 | Heling et al. |

(Continued)

FOREIGN PATENT DOCUMENTS

DE     196 51 557     6/1998

(Continued)

OTHER PUBLICATIONS

S. Ashley, Rapid Prototyping Systems, *Mechanical Engineering*, Apr. 1991, pp. 34-43.

*Primary Examiner*—Eric Hug
(74) *Attorney, Agent, or Firm*—Frommer Lawrence & Haug LLP; Ronald R. Santucci (57) ABSTRACT

A method of manufacturing and a papermaker's or industrial fabric, which includes the application of a polymeric resin material onto preselected discrete locations on a base substrate in a controlled manner in droplets having an average diameter of 10μ (10 microns) to point bond yarns, bond spiral wound strips together or to bond layers of a fabric together.

23 Claims, 8 Drawing Sheets

U.S. PATENT DOCUMENTS

| | | | |
|---|---|---|---|
| 3,994,662 A | 11/1976 | Bramley | |
| 4,109,543 A | 8/1978 | Foti | 74/231 |
| 4,111,634 A | 9/1978 | Limbach et al. | |
| 4,187,618 A | 2/1980 | Diehl | 34/243 |
| 4,191,609 A | 3/1980 | Trokhan | 162/113 |
| 4,196,248 A * | 4/1980 | Dutt | 442/60 |
| 4,239,065 A | 12/1980 | Trokhan | 139/383 |
| 4,251,928 A | 2/1981 | Rotar et al. | 34/116 |
| 4,300,982 A | 11/1981 | Romanski | 162/358 |
| 4,312,009 A | 1/1982 | Lange | 346/140 |
| 4,382,987 A | 5/1983 | Smart | 428/212 |
| 4,383,495 A | 5/1983 | Plichta et al. | 118/406 |
| 4,427,734 A | 1/1984 | Johnson | 428/234 |
| 4,482,430 A | 11/1984 | Majaniemi | 162/358 |
| 4,514,345 A | 4/1985 | Johnson et al. | 264/22 |
| 4,528,239 A | 7/1985 | Trokhan | 428/247 |
| 4,529,480 A | 7/1985 | Trokhan | 162/109 |
| 4,567,077 A | 1/1986 | Gauthier | 428/114 |
| 4,571,798 A | 2/1986 | Adams | |
| 4,637,859 A | 1/1987 | Trokhan | 162/109 |
| 4,752,519 A | 6/1988 | Boyer et al. | |
| 4,917,937 A | 4/1990 | Leppanen et al. | |
| 4,981,745 A | 1/1991 | Lefkowitz | 428/147 |
| 5,066,532 A | 11/1991 | Gaisser | 428/137 |
| 5,084,326 A | 1/1992 | Vohringer | |
| 5,136,515 A | 8/1992 | Helsinki | 364/468 |
| 5,238,537 A | 8/1993 | Dutt | 162/358.4 |
| 5,240,531 A | 8/1993 | Toda et al. | 156/137 |
| 5,277,761 A | 1/1994 | Van Phan et al. | 162/109 |
| 5,292,438 A | 3/1994 | Lee | |
| 5,298,124 A | 3/1994 | Eklund et al. | 162/306 |
| 5,360,656 A | 11/1994 | Rexfelt et al. | 428/193 |
| 5,397,438 A | 3/1995 | Nyberg et al. | 162/207 |
| 5,422,166 A | 6/1995 | Fleischer | |
| 5,462,642 A | 10/1995 | Kajander | 162/116 |
| 5,506,607 A | 4/1996 | Sanders, Jr. et al. | 347/1 |
| 5,515,779 A | 5/1996 | Danby | |
| 5,518,680 A | 5/1996 | Cima et al. | |
| 5,556,509 A | 9/1996 | Trokhan et al. | 162/111 |
| 5,672,248 A | 9/1997 | Wendt et al. | 162/109 |
| 5,679,222 A | 10/1997 | Rasch et al. | 162/358.1 |
| 5,713,399 A | 2/1998 | Collette et al. | 139/383 |
| 5,714,041 A | 2/1998 | Ayers et al. | 162/111 |
| 5,731,059 A | 3/1998 | Smith et al. | 428/192 |
| 5,733,608 A | 3/1998 | Kessel et al. | 427/547 |
| 5,740,051 A | 4/1998 | Sanders, Jr. et al. | 364/468.26 |
| 5,746,887 A | 5/1998 | Wendt et al. | 162/109 |
| 5,787,602 A | 8/1998 | Hsu et al. | 34/116 |
| 5,804,036 A | 9/1998 | Phan et al. | |
| 5,817,374 A | 10/1998 | Detig et al. | 427/466 |
| 5,817,377 A | 10/1998 | Trokhan et al. | |
| 5,829,488 A | 11/1998 | Fagerholm et al. | 139/383 |
| 5,849,395 A | 12/1998 | Valentine et al. | |
| 6,080,691 A | 6/2000 | Lindsay et al. | 442/381 |
| 6,099,781 A | 8/2000 | Ampulski | |
| 6,120,642 A | 9/2000 | Lindsay et al. | 162/109 |
| 6,136,151 A | 10/2000 | Davenport et al. | 162/306 |
| 6,136,157 A | 10/2000 | Lindeberg et al. | 204/157.6 |
| 6,193,847 B1 | 2/2001 | Trokhan | |
| 6,340,413 B1 | 1/2002 | Nilsson et al. | 162/361 |
| 6,350,336 B1 | 2/2002 | Paquin | 156/93 |
| 6,358,030 B1 | 3/2002 | Ampulski | |
| 6,358,594 B1 | 3/2002 | Ampulski | |
| 6,398,910 B1 | 6/2002 | Burazin et al. | |
| 6,419,795 B1 | 7/2002 | Dutt | |
| 6,872,283 B1 * | 3/2005 | Best | 162/358.2 |
| 2001/0035598 A1 | 11/2001 | Ampulski | |
| 2002/0107495 A1 | 8/2002 | Chen et al. | |

FOREIGN PATENT DOCUMENTS

| | | |
|---|---|---|
| EP | 0 677 612 A2 | 10/1985 |
| EP | 0 487 477 | 5/1992 |
| EP | 0 568 509 | 11/1993 |
| EP | 0 613 729 | 9/1994 |
| GB | 1 053 282 | 5/1963 |
| GB | 1058616 * | 2/1967 |
| WO | WO 92/00415 | 1/1992 |
| WO | WO 93/00474 | 1/1993 |
| WO | WO 96/35018 | 11/1996 |
| WO | WO 97/14846 | 4/1997 |
| WO | WO 99/35332 | 7/1999 |
| WO | WO 00/09308 | 2/2000 |
| WO | WO 02/088464 A1 | 11/2002 |
| WO | WO 2004/045834 A1 | 6/2004 |

* cited by examiner

METHODS FOR BONDING STRUCTURAL ELEMENTS OF PAPER MACHINE AND INDUSTRIAL FABRICS TO ONE ANOTHER AND FABRICS PRODUCED THEREBY

BACKGROUND OF THE INVENTION

1. Field of the Invention

The present invention relates, in part, to the papermaking arts, and specifically to the fabrics, commonly referred to as paper machine clothing, on which paper is manufactured on paper machines. The present invention also relates to the manufacture of nonwoven articles and products by processes such as hydroentanglement, and specifically to the so-called industrial fabrics on which such articles are manufactured. More specifically still, the present invention concerns the bonding of structural elements, such as individual yarns or separate layers, of such fabrics to one another by methods in which polymeric resin materials are used as bonding agents and are deposited in a highly controlled and precise manner.

2. Description of the Prior Art

During the papermaking process, a cellulosic fibrous web is formed by depositing a fibrous slurry, that is, an aqueous dispersion of cellulose fibers, onto a moving forming fabric in the forming section of a paper machine. A large amount of water is drained from the slurry through the forming fabric, leaving the cellulosic fibrous web on the surface of the forming fabric.

The newly formed cellulosic fibrous web proceeds from the forming section to a press section, which includes a series of press nips. The cellulosic fibrous web passes through the press nips supported by a press fabric, or, as is often the case, between two such press fabrics. In the press nips, the cellulosic fibrous web is subjected to compressive forces which squeeze water therefrom, and which adhere the cellulosic fibers in the web to one another to turn the cellulosic fibrous web into a paper sheet. The water is accepted by the press fabric or fabrics and, ideally, does not return to the paper sheet.

The paper sheet finally proceeds to a dryer section, which includes at least one series of rotatable dryer drums or cylinders, which are internally heated by steam. The newly formed paper sheet is directed in a serpentine path sequentially around each in the series of drums by a dryer fabric, which holds the paper sheet closely against the surfaces of the drums. The heated drums reduce the water content of the paper sheet to a desirable level through evaporation.

It should be appreciated that the forming, press and dryer fabrics all take the form of endless loops on the paper machine and function in the manner of conveyors. It should further be appreciated that paper manufacture is a continuous process which proceeds at considerable speeds. That is to say, the fibrous slurry is continuously deposited onto the forming fabric in the forming section, while a newly manufactured paper sheet is continuously wound onto rolls after it exits from the dryer section.

Contemporary fabrics are produced in a wide variety of styles designed to meet the requirements of the paper machines on which they are installed for the paper grades being manufactured. Generally, they comprise a woven or other type base fabric. Additionally, as in the case of fabrics used in the press section, the press fabrics have one or more base fabrics into which has been needled a batt of fine, nonwoven fibrous material. The base fabrics may be woven from monofilament, plied monofilament, multifilament or plied multifilament yarns, and may be single-layered, multi-layered or laminated. The yarns are typically extruded from any one of the synthetic polymeric resins, such as polyamide and polyester resins, used for this purpose by those of ordinary skill in the paper machine clothing arts.

The woven base fabrics themselves take many different forms. For example, they may be woven endless, or flat woven and subsequently rendered into endless form with a woven seam. Alternatively, they may be produced by a process commonly known as modified endless weaving, wherein the widthwise edges of the base fabric are provided with seaming loops using the machine-direction (MD) yarns thereof. In this process, the MD yarns weave continuously back-and-forth between the widthwise edges of the fabric, at each edge turning back and forming a seaming loop. A base fabric produced in this fashion is placed into endless form during installation on a paper machine, and for this reason is referred to as an on-machine-seamable fabric. To place such a fabric into endless form, the two widthwise edges are brought together, the seaming loops at the two edges are interdigitated with one another, and a seaming pin or pintle is directed through the passage formed by the interdigitated seaming loops.

Further, the base fabrics may be laminated by placing at least one base fabric within the endless loop formed by another, and by typically needling a staple fiber batt through these base fabrics to join them to one another as in the case of press fabrics. One or more of these woven base fabrics may be of the on-machine-seamable type. This is now a well known laminated press fabric with a multiple base support structure. In any event, the fabrics are in the form of endless loops, or are seamable into such forms, having a specific length, measured longitudinally therearound, and a specific width, measured transversely thereacross. Also disclosed are "subassemblies" of various materials which are then spiraled or laid up in parallel strips to form substrates for press fabrics; the subassemblies are formed by techniques including lamination.

Turning now to industrial process belts, laminated structures are known in the textile industry. Lamination techniques are also used to form roll covers used in papermaking. One prior art belt is composed only of nonwoven fibrous material as the substrate. Also previously disclosed are laminated nonwovens for use as press fabrics with each layer has different properties such as hydrophobicity, and multiple extruded sheets as support structures for belts. Another prior patent teaches spirally winding strips of various types of materials to form a support structure for a belt. The prior art also teaches a substrate of expanded film, and narrow composite "tapes". Additional prior art includes the following:

U.S. Pat. No. 3,042,568 shows a method and apparatus for the manufacture of laminated fabric belting. A heating chamber and pressure rollers are used to bond a plurality of lengths of plastic-coated fabric into a laminated unitary belt;

U.S. Pat. No. 3,673,023 shows a process for producing a reinforced laminate for use in belts where high tensile strength is required. The belts are made by laying helically wound, continuous reinforcing cords in what is essentially a screw thread or threads extending between the lateral margins of a base. The belt is finished by a top ply laid over the wound carcass, which is then cured with heat and pressure to form a consolidated belt structure;

U.S. Pat. No. 4,109,543 shows a composite laminate. The laminate comprises a hot-melt-type thermoplastic material and a textile woven fabric material formed of spun yarns constructed primarily of staple fibers. They are combined with each other using heat and pressure to form a belt; and U.S. Pat. No. 5,240,531 shows an endless conveyor belt consisting of a core member and an elastic laminate layer. The layers are together passed through a pressing apparatus that bonds them together through the use of heat and pressure.

In the case of many applications, including woven fabrics, fabrics produced by spirally winding a strip of woven or knitted fabric (see U.S. Pat. No. 5,360,656 to Rexfelt), laminated fabrics all require some mechanism for either keeping the yarns in place or for joining the fabric together. Typically heretofor needling of staple fiber through a multilayer fabric was utilized to keep it together. Other methods as aforenoted were utilized such as bonding or welding.

The present invention provides another approach towards bonding and providing dimensional stability to fabrics.

SUMMARY OF THE INVENTION

Accordingly, the present invention may find application in any of the fabrics used in the forming, pressing and drying sections of a paper machine, and in the industrial fabrics used in the manufacture of nonwoven products. As such, the papermaker's or industrial fabric comprises a base substrate which takes the form of an endless loop. In one embodiment, a plurality of discrete, discontinuous deposits of polymeric resin material are disposed at the crossover points or locations of the yarns in the fabric. These deposits bond the yarns together at these points and provide dimensional stability to the fabric.

The preselected locations for the discrete, discontinuous deposits of polymeric resin material may be where the yarns in one direction of the fabric pass over or under the yarns in the other direction. Bonding can take place at all or just some of the crossover points.

In another embodiment, preselected locations may be used to join adjacent steps of spiral wound fabric strip to one another.

In a third embodiment, the preselected locations for the bonding resin are knuckles formed by crossover yarns or other locations which will allow upon heating or other activating means to bond additional layers to the base fabric to create a laminate.

DETAILED DESCRIPTION OF THE PREFERRED EMBODIMENTS

As stated above, in a first embodiment of the present invention, the yarns in a woven paper machine or industrial fabric are bonded to one another at their crossing points. Typically, the fabric, which may be a base substrate for a coated belt or some other item of paper machine clothing and which may be of an open weave in which the yarns would tend to shift from their intended positions unless bonded to one another in accordance with the present invention, is woven from monofilament yarns.

More broadly, however, the fabric may be a woven, nonwoven, spiral-link, MD or CD yarn arrays, or knitted fabric comprising yarns of any of the varieties used in the production of paper machine clothing or of the industrial fabrics used to manufacture nonwoven articles and products, such as monofilament, plied monofilament, multifilament and plied multifilament yarns. These yarns may be obtained by extrusion from any of the polymeric resin materials used for this purpose by those of ordinary skill in the art. Accordingly, resins from the families of polyamide, polyester, polyurethane, polyaramid, polyolefin and other resins may be used.

Alternatively, the fabric may be produced by spirally winding a strip of woven, knitted or other material in accordance with the methods shown in commonly assigned U.S. Pat. No. 5,360,656 to Rexfelt et al., the teachings of which are incorporated herein by reference. The fabric may accordingly comprise a spirally wound strip, wherein each spiral turn is joined to the next by a continuous seam making the fabric endless in a longitudinal direction. The joining of the spiral turns to one another may be accomplished in accordance with a second embodiment of the present invention to be discussed in greater detail below.

The above should not be considered to be the only possible forms for the fabric. Any of the varieties of fabric used by those of ordinary skill in the paper machine clothing and related arts may alternatively be used.

Figure 1:
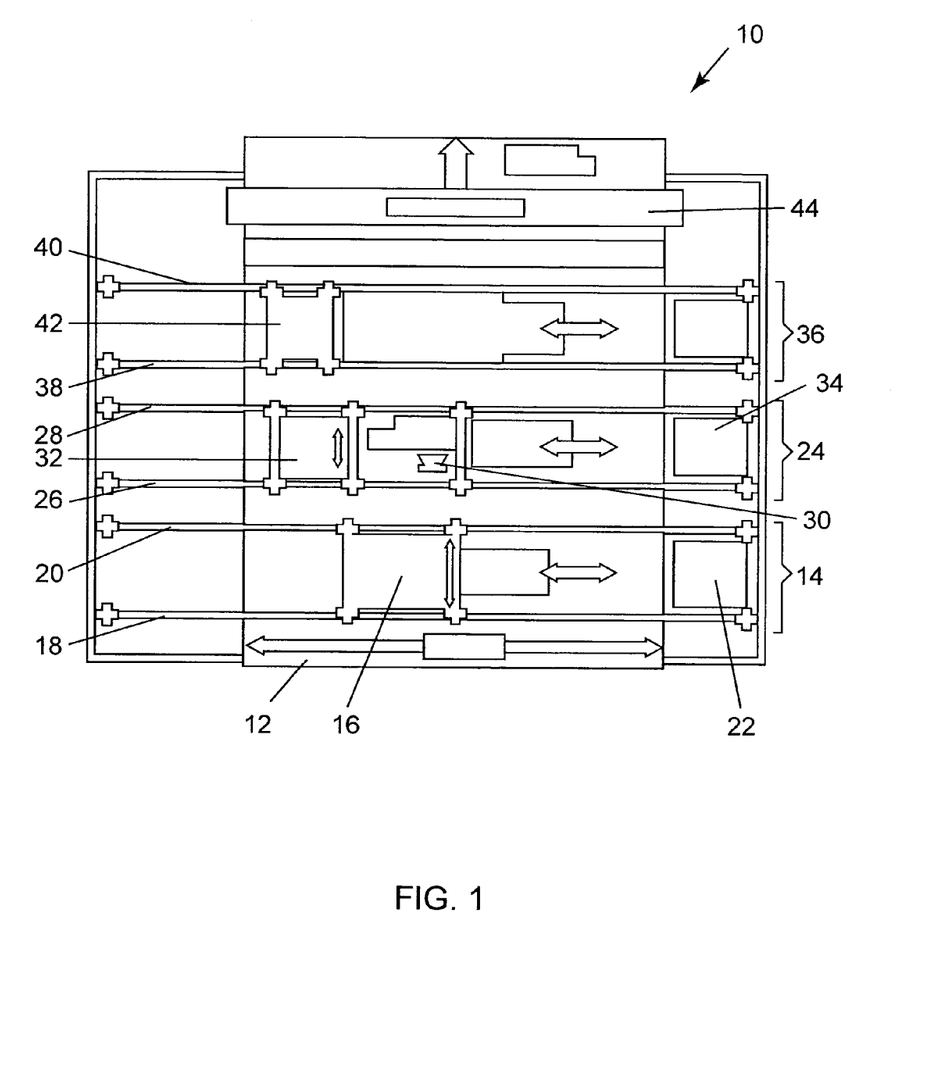
FIG. 1 is a schematic view of an apparatus used to manufacture papermaker's and industrial fabrics according to a first embodiment of the present invention.

Whatever the specific form of the fabric, it is mounted on the apparatus 10 shown schematically in FIG. 1, so that polymeric resin material may be deposited onto the points where its yarns cross one another in either a woven structure or nonwoven structure such as an MD or CD yarn array, in accordance with this first embodiment of the present invention.

It should be understood that the fabric may be either endless or seamable into endless form during installation on a paper machine. As such, the fabric 12 shown in FIG. 1 should be understood to be a relatively short portion of the entire length of the fabric. Where the fabric 12 is endless, it would most practically be mounted about a pair of rolls, not illustrated in the figure but most familiar to those of ordinary skill in the paper machine clothing arts. In such a situation, apparatus 10 would be disposed on one of the two runs, most conveniently the top run, of the fabric 12 between the two roll. Whether endless or not, however, the fabric 12 is preferably placed under an appropriate degree of tension during the process. Moreover, to prevent sagging, the fabric 12 may be supported from below by a horizontal support member as it moves through apparatus 10. It should finally be observed that, where the fabric 12 is endless, it may be desirable to invert it, that is, to turn it inside out, following the application of polymeric resin material in accordance with this first embodiment of the present invention to place the polymeric resin material on the backside of the fabric 12.

Referring now more specifically to FIG. 1, where the fabric 12 is indicated as moving in an upward direction through the apparatus 10 as the method of this first embodiment of the present invention is being carried out, apparatus 10 comprises a sequence of several stations through which the fabric 12 may pass incrementally.

The stations are identified as follows:
1. optional polymer deposition station 14;
2. imaging/precise polymer deposition station 24;
3. optional setting station 36; and
4. optional grinding station 44.

In the first station, the optional polymer deposition station 14, a piezojet array 16 mounted on transverse rails 18, 20 and translatable thereon in a direction transverse to that of the motion of the fabric 12 through the apparatus 10, as well as therebetween in a direction parallel to that of the motion of the fabric 12, may be used to deposit a polymeric resin material in a repetitive fashion if necessary to provide the proper bonding onto or within the fabric 12 while the fabric 12 is at rest. Optional polymer deposition station 14 may be used to deposit the polymeric resin material more uniformly over the fabric 12 than could be accomplished using conventional techniques, such as spraying, if desired. It should be understood, however, that the optional polymer deposition station 14 would apply the polymeric resin material indiscriminately to both the yarns of the fabric 12 and to the spaces or interstices between the yarns. This may not be desired in all applications and, as such, the use of polymer deposition station 14 is optional in this and other embodiments of the present invention.

However, for the sake of completeness, the piezojet array 16 comprises at least one but preferably a plurality of individual computer controlled piezojets, each functioning as a pump whose active component is a piezoelectric element. As a practical matter, an array of up to 256 piezojets or more may be utilized, if the technology permits. The active component is a crystal or ceramic which is physically deformed by an applied electric signal. This deformation enables the crystal or ceramic to function as a pump, which physically ejects a drop of a liquid material each time an appropriate electric signal is received. As such, this method of using piezojets to supply drops of a desired material in response to computer controlled electric signals is commonly referred to as a "drop-on-demand" method.

Referring again to FIG. 1, the piezojet array 16, starting from an edge of the fabric 12, or, preferably, from a reference thread extending lengthwise therein, translates lengthwise and widthwise across the fabric 12, while the fabric 12 is at rest, deposits the polymeric resin material in the form of extremely small droplets having a nominal diameter of 10μ (10 microns) or more, such as 50μ (50 microns), or 100μ (100 microns), onto the fabric 12. The translation of the piezojet array 16 lengthwise and widthwise relative to the fabric 12, and the deposition of droplets of the polymeric resin material from each piezojet in the array 16, are controlled by computer to apply a desired amount of the polymeric resin material per unit area of the fabric 12, if desired. In addition, the deposit of the material need not only be traversing the movement of the base substrate but can be parallel to such movement, spiral to such movement or in any other manner suitable for the purpose.

In the present invention, in which a piezojet array is used to deposit a polymeric resin material onto or within the surface of the fabric base substrate 12, the choice of polymeric resin material is limited by the requirement that its viscosity be 100 cps (100 centipoise) or less at the time of delivery, that is, when the polymeric resin material is in the nozzle of a piezojet ready for deposition, so that the individual piezojets can provide the polymeric resin material at a constant drop delivery rate. A second requirement limiting the choice of polymeric resin material is that it must partially set during its fall, as a drop, from a piezojet to the fabric 12, or after it lands on the fabric 12, to prevent the polymeric resin material from flowing and to maintain control over the polymeric resin material to ensure that it remains in the form of a drop where it lands on the fabric 12. Suitable polymeric resin materials which meet these criteria are 1. Hot melts and moisture-cured hot melts;
2. Two-part reactive systems based on urethanes and epoxies;
3. Photopolymer compositions consisting of reactive acrylated monomers and acrylated oligomers derived from urethanes, polyesters, polyethers, and silicones; and
4. Aqueous-based latexes and dispersions and particle-filled formulations including acrylics and polyurethanes.

It should be understood that the polymeric resin material needs to be fixed on or within the fabric 12 following its deposition thereon. The means by which the polymeric resin material is set or fixed depends on its own physical and/or chemical requirements. Photopolymers are cured with light, whereas hot-melt materials are set by cooling. Aqueous-based latexes and dispersions are dried and then cured with heat, and reactive systems are cured by heat. Accordingly, the polymeric resin materials may be set by curing, cooling, drying or any combination thereof.

The proper fixing of the polymeric resin material is required to control its penetration into and distribution within the fabric 12, that is, to control and confine the material within the desired volume of the fabric 12. Such control is important below the surface plane of the fabric 12 to prevent wicking and spreading. Such control may be exercised, for example, by maintaining the fabric 12 at a temperature which will cause the polymeric resin material to set quickly upon contact. Control may also be exercised by using such materials having well-known or well-defined curing or reaction times on fabrics having a degree of openness such that the polymeric resin material will set before it has time to spread beyond the desired volume of the fabric 12.

The degree of precision of the jet in depositing the material will depend upon the dimensions and amount of the material being deposited. The type of jet used and the viscosity of the material being applied will also impact the precision of the jet selected.

When any desired amount of polymeric resin material has been applied per unit area in a band between the transverse rails 18, 20 across the fabric 12, if any, the fabric 12 is advanced lengthwise an amount equal to the width of the band, and the procedure described above is repeated to apply the polymeric resin material in a new band adjacent to that previously completed. In this repetitive manner, the entire fabric 12 can be provided with any desired amount of polymeric resin material per unit area.

One or more passes over the base substrate 12 may be made by piezojet array 16 to deposit the desired amount of material and to create the desired bond.

Alternatively, the piezojet array 16, again starting from an edge of the fabric 12, or, preferably, from a reference thread extending lengthwise therein, is kept in a fixed position relative to the transverse rails 18, 20, while the fabric 12 moves beneath it, to apply any desired amount of the polymeric resin material per unit area repetitively so as to provide bonding in a lengthwise strip around the fabric 12. Upon completion of the lengthwise strip, the piezojet array 16 is moved widthwise on transverse rails 18, 20 an amount equal to the width of the lengthwise strip, and the procedure described above is repeated to apply the polymeric resin material in a new lengthwise strip adjacent to that previously completed. In this repetitive manner, the entire fabric 12 can be provided with the desired amount of polymeric resin material per unit area, if desired.

At one end of the transverse rails 18, 20, a jet check station 22 is provided for testing the flow of polymeric resin material from each piezojet in the piezojet array 16. There, the piezojets can be purged and cleaned to restore operation automatically to any malfunctioning piezojet unit.

In the second station, the imaging/precise polymer deposition station 24, the only station not optional in the present invention, transverse rails 26, 28 support a digital-imaging camera 30, which is translatable across the width of fabric 12, and a piezojet array 32, which is translatable both across the width of the fabric 12 and lengthwise relative thereto between transverse rails 26, 28, while the fabric 12 is at rest.

The digital-imaging camera 30 views the surface of the fabric 12 to locate the locations where the material is to be deposited for bonding purposes. For example, the knuckles where the yarns in one direction of the fabric 12 weave over those in the other direction may be the location points or where one yarn crosses the other in a nonwoven yarn array may be another. Comparisons between the actual surface and its desired appearance are made by a fast pattern recognizer (FPR) processor operating in conjunction with the digital-imaging camera 30. The FPR processor signals the piezojet array 32 to deposit polymeric resin material onto the locations requiring it to match the desired appearance. In this first embodiment of the present invention, the polymeric resin material is deposited onto the yarns in a controlled manner over the cross over location or where the knuckles are formed and adjacent to the respective yarns to bond the yarns to one another at their crossing points. As in optional polymer deposition station 14, a piezojet check station 34 is provided at one end of the transverse rails 26, 28 for testing the flow of material from each piezojet. There, each piezojet in the piezojet array 32 can be purged and cleaned to restore operation automatically to any malfunctioning piezojet unit.

Figure 2:
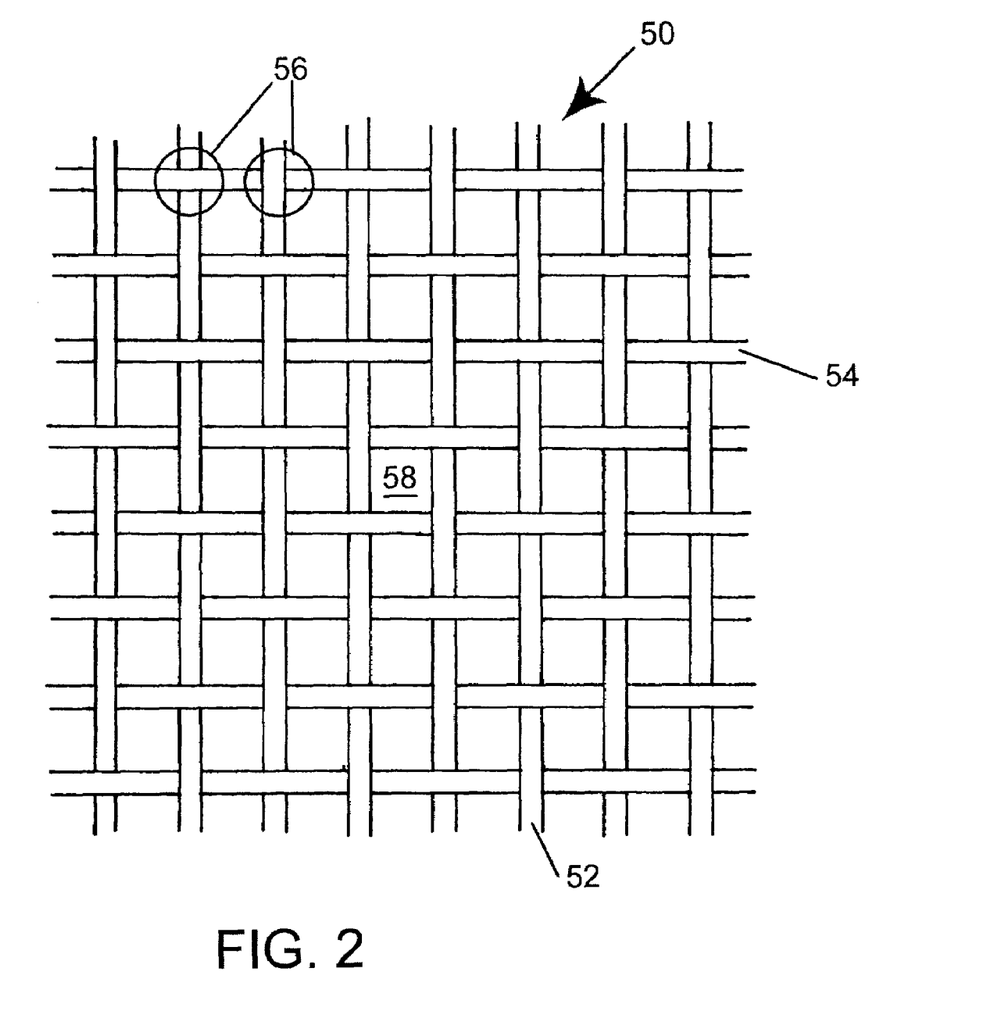
FIG. 2 is a plan view of the surface of a fabric on which the first embodiment may be practiced.

By way of illustration, FIG. 2 is a plan view of the surface of a fabric 50, which is woven in a fairly open, plain weave from lengthwise yarns 52 and crosswise yarns 54. Knuckles 56 are formed where lengthwise yarns 52 pass over crosswise yarns 54 and where crosswise yarns 54 pass over lengthwise yarns 52. Because interstices 58 are relatively large, a measure of the openness of the weave, it is straightforward to imagine that the lengthwise and crosswise yarns 52, 54 could readily shift from the idealized positions shown in FIG. 2 and that the fabric 50 may be somewhat sleazy.

Figure 3:
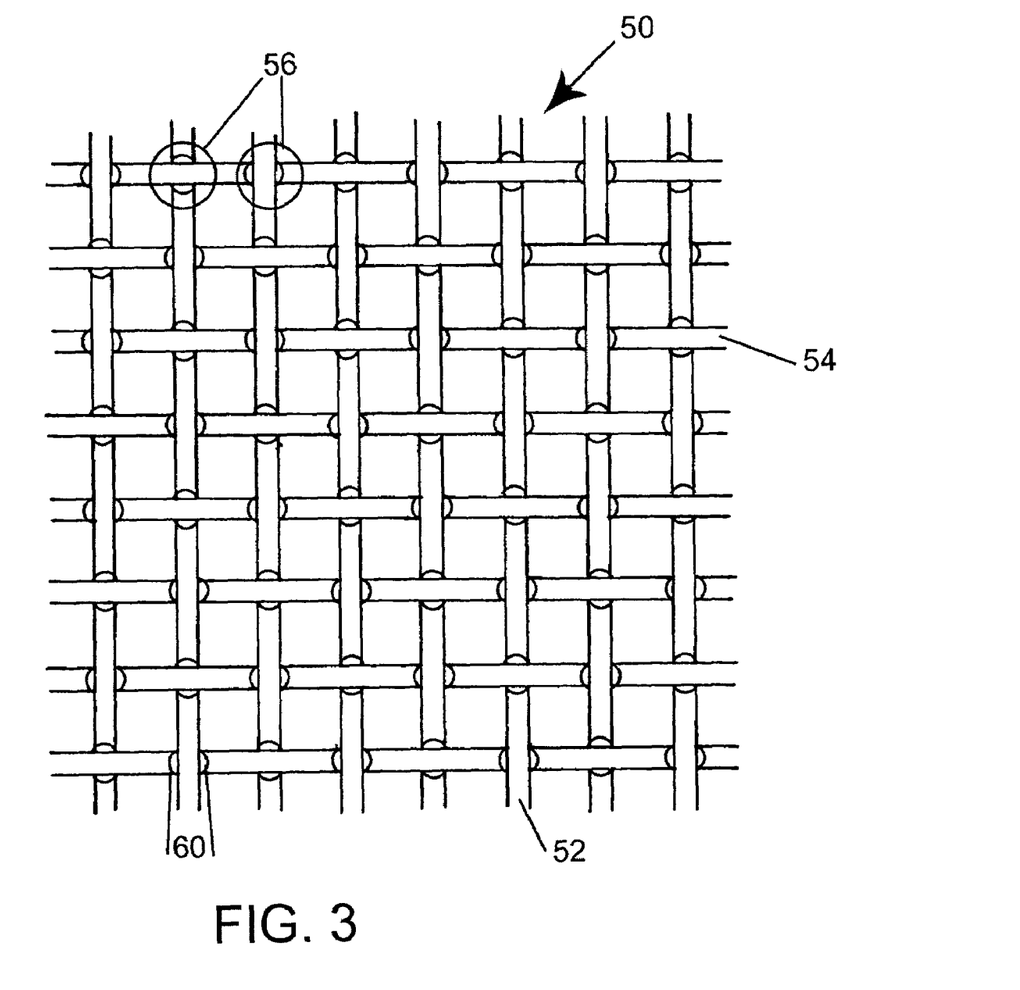
FIG. 3 is a plan view of the fabric shown in FIG. 2 following the practice of the first embodiment thereon.

FIG. 3 is a plan view of the surface of fabric 50 showing the manner in which polymeric resin material is deposited thereon in imaging/precise polymer deposition station 24. On either side of each knuckle 56, polymeric resin material 60 is deposited on the lengthwise or crosswise yarn 52, 54 over which the knuckle 56 is formed to bond the two yarns 52, 54 to one another at the crossing point represented by the knuckle 56.

In the third station, the optional setting station 36, transverse rails 38, 40 support a setting device 42, which may be required to set the polymeric resin material being used. The setting device 42 may be a heat source, for example, an infrared, hot air, microwave or laser source; cold air; or an ultraviolet or visible-light source, the choice being governed by the requirements of the polymeric resin material being used.

Finally, the fourth and last station is the optional grinding station 44, where an appropriate abrasive is used to provide any polymeric resin material above the surface plane of the fabric 12 with a uniform thickness. The optional grinding station 44 may comprise a roll having an abrasive surface, and another roll or backing surface on the other side of the fabric 12 to ensure that the grinding will result in a uniform thickness.

In a variation of the present invention, the optional polymer deposition station 14, the imaging/precise polymer deposition station 24, and the optional setting station 36 may be adapted to treat fabric 12 according to a spiral technique, rather than by indexing in the cross-machine direction as described above. In a spiral technique, the optional polymer deposition station 14, the imaging/precise polymer deposition station 24, and the optional setting station 36 start at one edge of the fabric 12, for example, the left-hand edge in FIG. 1, and are gradually moved across the fabric 12, as the fabric 12 moves in the direction indicated in FIG. 1. The rates at which the stations 14, 24, 36 and the fabric 12 are moved are set so that the polymeric resin material desired in the finished fabric is spiraled onto the fabric 12 as desired in a continuous manner. In this alternative, the polymeric resin material deposited by the optional polymer deposition station 14 and imaging/precise polymer deposition station 24 may be partially set or fixed as each spiral passes beneath the optional setting device 42, and completely set when the entire fabric 12 has been processed through the apparatus 10.

Alternatively, the optional polymer deposition station 14, the imaging/precise polymer deposition station 24 and the optional setting station 36 may all be kept in fixed positions aligned with one another, while the fabric 12 moves beneath them, so that the polymeric resin material desired for the finished fabric may be applied to a lengthwise strip around the fabric 12. Upon completion of the lengthwise strip, the optional polymer deposition station 14, the imaging/precise polymer deposition station 24 and the optional setting station 36 are moved widthwise an amount equal to the width of the lengthwise strip, and the procedure is repeated for a new lengthwise strip adjacent to that previously completed. In this repetitive manner the entire fabric 12 can be completely treated as desired.

Furthermore, the entire apparatus can remain in a fixed position with the material processed. It should be noted that the material need not be a full width structure but can be a strip of material such as that disclosed in U.S. Pat. No. 5,360,656 to Rexfelt, the disclosure of which is incorporated herein by reference, and subsequently formed into a full width fabric. The strip can be unwound and wound up on a set of rolls after fully processing. These rolls of fabric materials can be stored and can then be used to form an endless full width structure using, for example, the teachings of the immediately aforementioned patent.

In this regard, a second embodiment of the present invention, apparatus 10 is now used to bond adjacent turns of a spirally wound fabric strip to one another to form an endless fabric. A method for doing so employing an ultrasonic welding apparatus is disclosed in commonly assigned U.S. Pat. No. 5,713,399 to Collette et al., the teachings of which are incorporated herein by reference.

More specifically, U.S. Pat. No. 5,713,399 discloses a method for manufacturing a papermaker's fabric by spirally winding a woven fabric strip, narrower than the intended width of the fabric, and the papermaker's fabric manufactured in accordance with the method. The fabric strip includes lengthwise and crosswise yarns, and has a lateral fringe along at least one lateral edge thereof, the lateral fringe being formed by unbound ends of the crosswise yarns extending beyond the lateral edge. During the spiral winding of the fringed strip, the lateral fringe of a turn overlies or underlies an adjacent turn of the strip. The lateral edges of adjacent turns abut against one another. The spirally continuous seam so obtained is closed by ultrasonically welding or bonding the overlying or underlying lateral fringe to the fabric strip in an adjacent turn.

Figure 4:
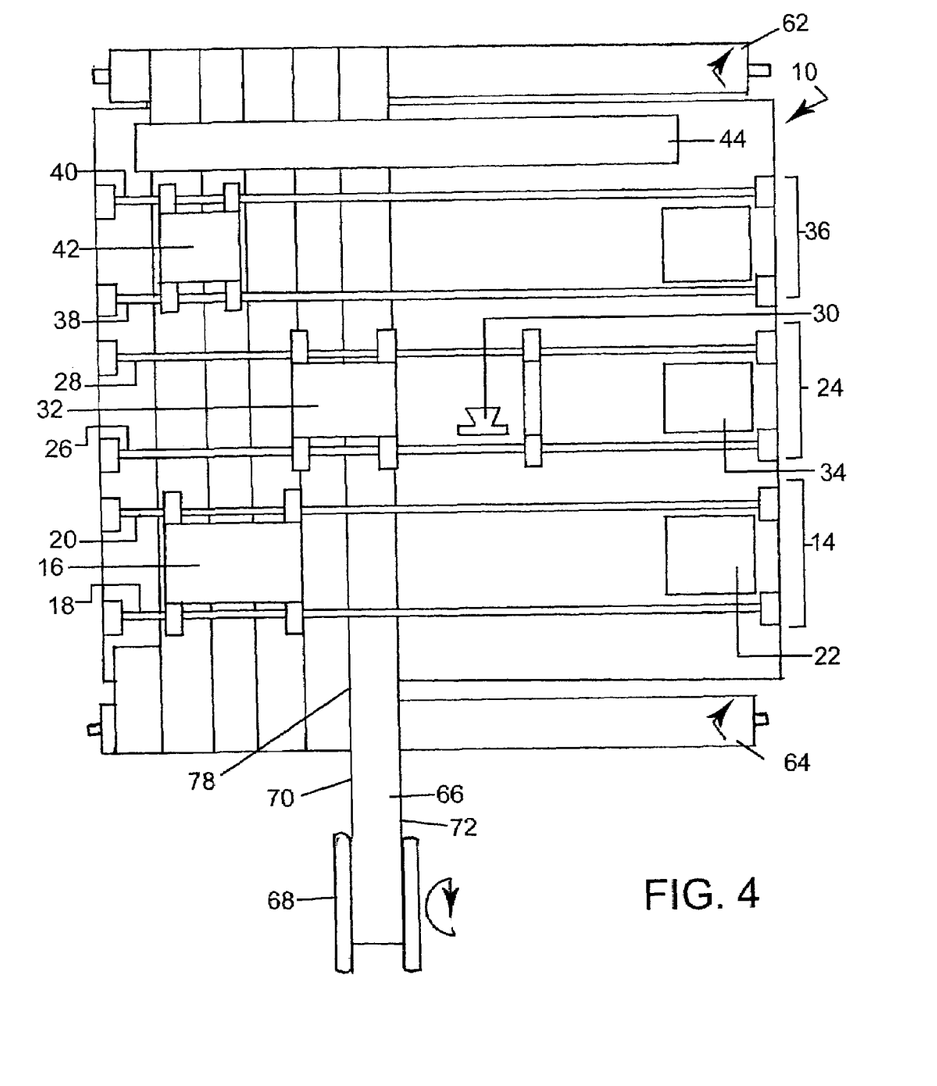
FIG. 4 is a schematic view of the apparatus shown in FIG. 1 as used in practicing a second embodiment of the present invention.

Referring now to FIG. 4, which shows apparatus 10 as previously shown in FIG. 1, but adapted to practice this second embodiment of the present invention with the addition of a first roll 62 and a second roll 64, which are parallel to one another and which may be rotated in the directions indicated by the arrows, a woven fabric strip 66 is wound from a stock roll 68 around the first roll 62 and the second roll 64 in a continuous spiral. It will be recognized that it will be necessary to translate the stock roll 68 at a suitable rate along the second roll 64, that is, to the right in FIG. 4, as the fabric strip 66 is being wound around the rolls 62,64.

Woven fabric strip 66 has a first lateral edge 70 and a second lateral edge 72. Extending beyond the woven fabric strip 66 along its first and second lateral edges 70, 72 are a first and a second lateral fringe 74, 76, respectively, which are not shown in FIG. 4.

Figure 5:
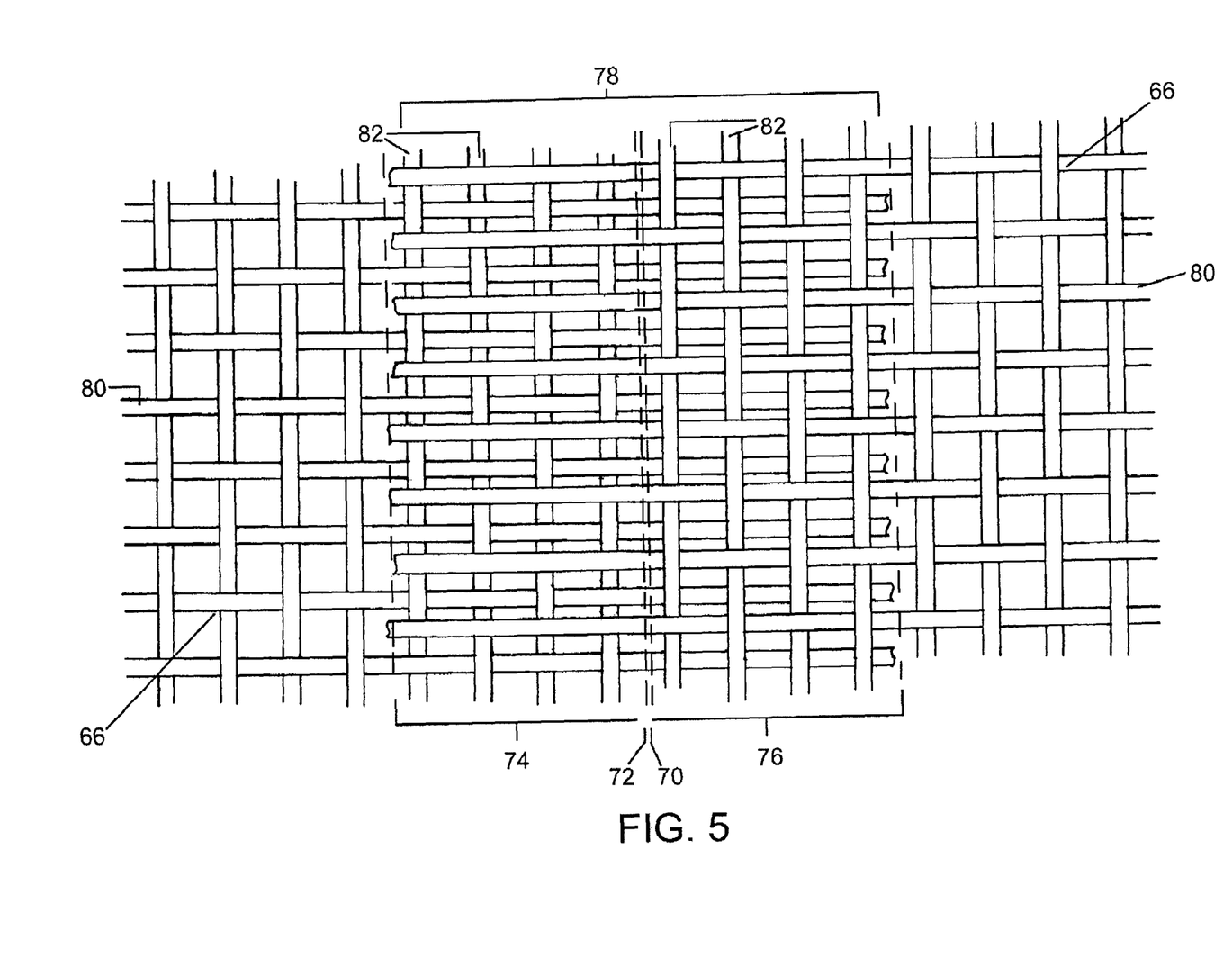
FIG. 5 is a plan view of a portion of a seam between turns of a spirally wound fabric strip before bonding in accordance with the second embodiment.

As woven fabric strip 66 is spirally wound around the first and second rolls 62, 64, its first lateral edge 70 is abutted against the second lateral edge 72 of the previously wound turn to define a spirally continuous seam 78. Referring now to FIG. 5, which is a plan view of a portion of the seam 78 before any bonding has taken place, first lateral fringe 74 formed by unbound ends of crosswise yarns 80 extending past lateral edge 70 overlies the previous turn of the woven fabric strip 66 when the first and second lateral edges 70, 72 are abutted against one another. Moreover, second lateral fringe 76 formed by unbound ends of crosswise yarns 80 extending past lateral edge 72 underlies the subsequent turn of the woven fabric strip 66 when the first and second lateral edges 70, 72 are abutted against one another.

In accordance with this second embodiment of the present invention, imaging/precise polymer deposition station 24 is used to close the spirally continuous seam 78 instead of the ultrasonic welding apparatus shown in U.S. Pat. No. 5,713, 399. Specifically, the digital imaging camera 30 views the surface of the spirally wound woven fabric strip 66 at the spirally continuous seam 78 to locate the points where the crosswise yarns 80 of the first lateral fringe 74 overlying the previous turn of the woven fabric strip 66 cross the lengthwise yarns 82 therein, and to locate the points where the crosswise yarns 80 of the second lateral fringe 76 underlying the subsequent turn of the woven fabric strip 66 cross the lengthwise yarns 82 therein. Comparisons between the actual surface and its desired appearance are made by a fast pattern recognizer (FPR) processor operating in conjunction with the digital-imaging camera 30. The FPR processor signals the piezojet array 32 to deposit polymeric resin material onto the locations requiring it to match the desired appearance. In this second embodiment of the present invention, the polymeric resin material is deposited onto the underlying yarn adjacent to the overlying yarn at the crossing points to bond the yarns to one another, thereby to close the spirally continuous seam 78.

Figure 6:
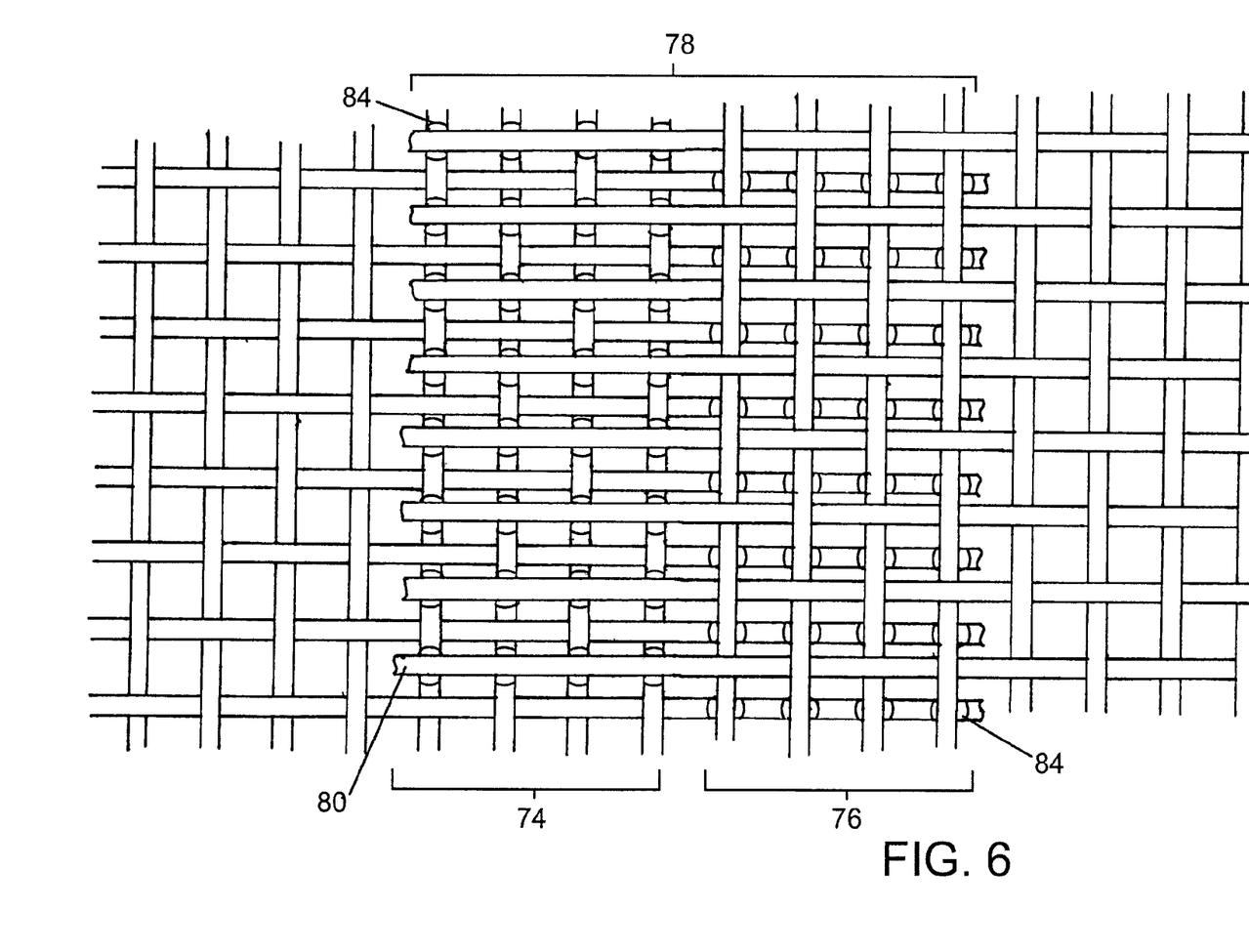
FIG. 6 is a plan view of the portion of the seam shown in FIG. 5 following the practice of the second embodiment thereon.

FIG. 6 is a plan view of the portion of the seam 78 shown in FIG. 5 after the bonding has been carried out. As shown, crosswise yarns 80 of the first lateral fringe 74 are bonded to the underlying lengthwise yarns 82 by polymeric resin material 84 deposited onto the lengthwise yarns 82 adjacent to crosswise yarns 80 by imaging/precise polymer deposition station 24. Similarly, crosswise yarns 80 of second lateral fringe 76 are bonded to the overlying lengthwise yarns 82 by polymeric resin material 84 deposited onto the crosswise yarns 80 adjacent to lengthwise yarns 82. In this manner, the spirally continuous seam 78 is closed by imaging/precise polymer deposition station 24. Similarly, the apparatus can be used to bond an array of MD yarns (or CD yarns) to each other. For example, an array of MD yarns is fed into the apparatus instead of the Rexfelt strip of material. The piezojet then deposits resin at precise, discontinuous locations along the length of coincident yarns in the space therebetween causing the yarns to bond to one another at that point. As the yarn array is fed into the apparatus, the piezojet will traverse to the next set of MD yarns and continue as such until the appropriate length and width of fabric is created. Subsequent additional passes of the piezo jets can be made for additional deposits, if so desired. Lengths of such fabric may be rolled up and stored for subsequent use in creating a full width fabric or as a layer of a laminate.

In a third embodiment of the present invention, apparatus 10 is used to laminate one fabric layer to another. A method for doing so is disclosed in commonly assigned U.S. Pat. No. 6,350,336 to Paquin, the teachings of which are incorporated herein by reference. More specifically, U.S. Pat. No. 6,350, 336 discloses a method for manufacturing a press fabric for a paper machine, which method includes the attachment of a strip of top laminate layer material to a base fabric using a heat activated adhesive film. The top laminate layer material may be a woven fabric, a nonwoven mesh or a thermoplastic sheet material, and, in any case, has the heat-activated adhesive film bonded to one of its two sides. The strip of top laminate layer material and heat activated adhesive film together form a multi-component strip, which is spiraled onto the outer surface of the base fabric, with the side of the strip of top laminate layer material having the heat-activated adhesive film against the outer surface, in a closed helix, and bonded thereto with heat and pressure. The portions of the multi-component strip overhanging the lateral edges of the base fabric are then trimmed and a staple fiber batt is needled into and through the top laminate layer formed by the multi-component strip to firmly attach it to the base fabric.

In accordance with this third embodiment of the present invention, imaging/precise polymer deposition station 24 is used to apply a thermoplastic polymeric resin material onto the knuckles formed where the yarns in one direction of the base fabric weave over those on the other direction.

Specifically, the digital-imaging camera 30 views the outer surface of the base fabric to locate the knuckles formed where the yarns in one direction of the base fabric weave over those in the other direction. Comparisons between the actual surface and its desired appearance are made by a fast pattern recognizer (FPR) processor operating in conjunction with the digital-imaging camera 30. The FPR processor signals the piezojet array 32 to deposit polymeric resin material onto the locations requiring it to match the desired appearance. In this third embodiment of the present invention, a thermoplastic polymeric resin material is deposited onto the knuckles on the outer surface of the base fabric.

Figure 7:
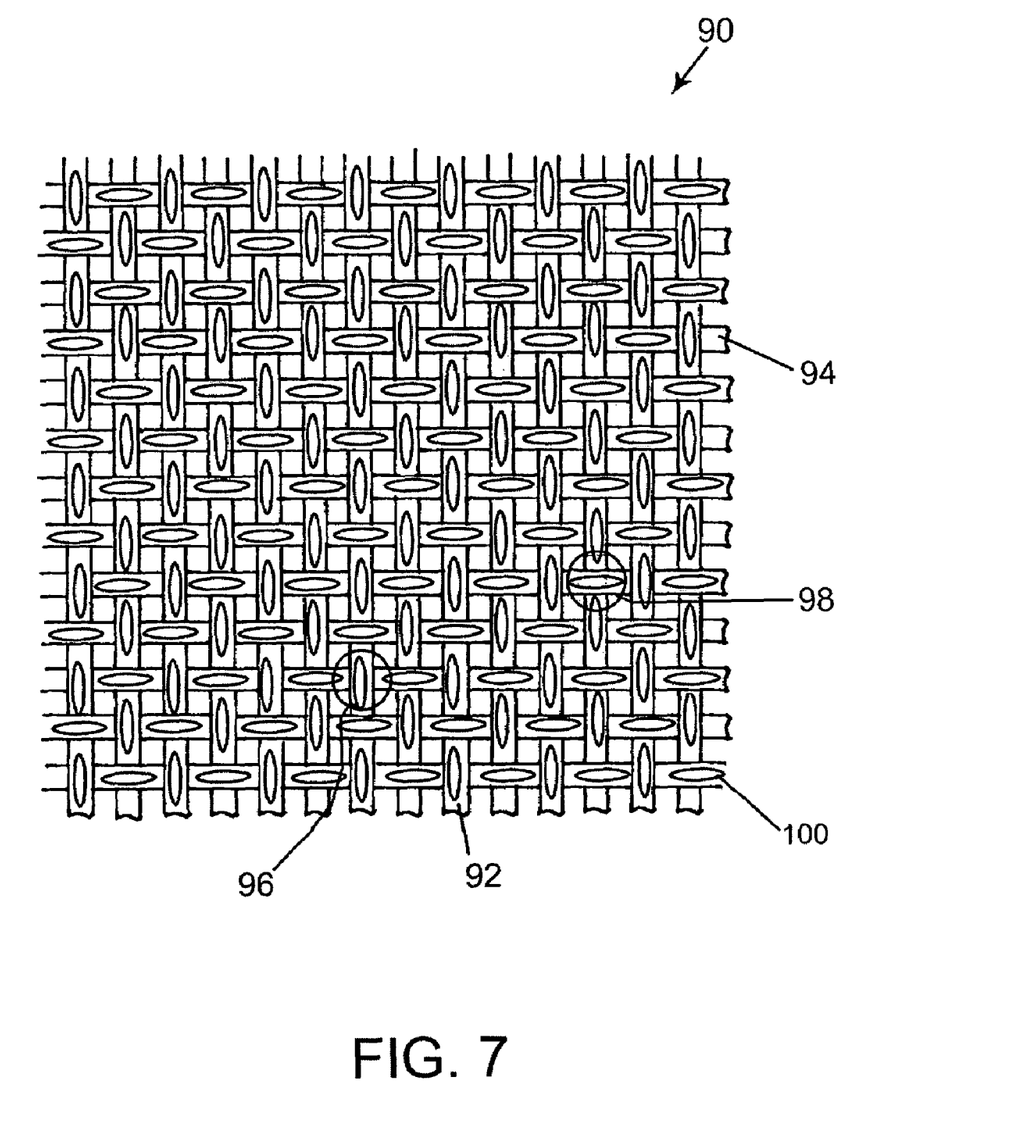
FIG. 7 is a plan view of the surface of a base fabric used for the practice of a third embodiment of the present invention.

FIG. 7 is a plan view of the surface of the base fabric 90 as it could appear following this deposition. Base fabric 90 is woven from lengthwise yarns 92 and crosswise yarns 94 in a single-layer plain weave, although it should be understood that the inventors do not intend the practice of the present invention to be limited to such a weave. The lengthwise yarns 92 form knuckles 96 where they pass over crosswise yarns 94. Similarly, the crosswise yarns 94 form knuckles 98 where they pass over lengthwise yarns 92. Knuckles 96, 98 have a coating 100 of thermoplastic polymeric resin material precisely applied thereto by imaging/precise polymer deposition station 24. Although each knuckle 96, 98 is shown to have such a coating 100, it need not be so, as it is within the scope of this third embodiment of the present invention to apply coating 100 only to certain preselected knuckles 96, 98, while leaving the remaining knuckles 96, 98 uncoated.

Figure 8:
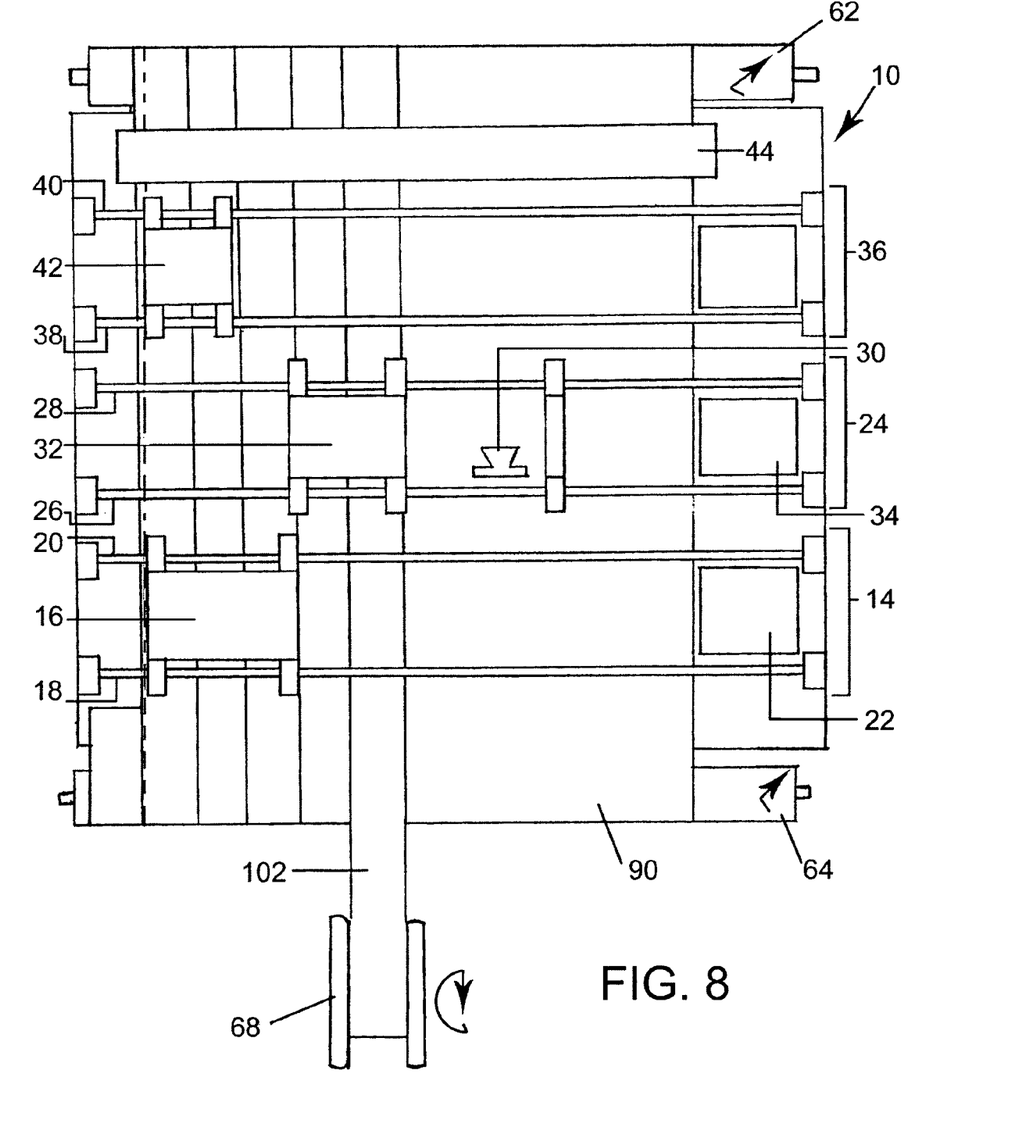
FIG. 8 is a schematic view of the apparatus shown in FIG. 1 as used in practicing the third embodiment.

Referring now to FIG. 8, which, like FIG. 4, shows apparatus 10 as previously shown in FIG. 1, but adapted to practice this third embodiment of the present invention with the addition of the first roll 62 and the second roll 64, which are parallel to one another and which may be rotated in the directions indicated by the arrows. Base fabric 90 remains entrained about the first and second rolls 62, 64 following the application of coating 100 onto knuckles 96, 98, and a strip 102 of top laminate layer material is spirally wound thereon in a closed helix from stock roll 68. The strip 102 of top laminate layer material may be, for example, a woven fabric, a nonwoven mesh, MD or CD yarn arrays or a thermoplastic sheet material. After the strip 102 of top laminate layer material is dispensed onto base fabric 90, it passes beneath the setting station 36, which, for this third embodiment of the present invention, is a heat source which melts the thermoplastic polymeric resin material on the knuckles 96, 98 to adhere the strip 102 of top laminate layer material to the base fabric 90. The base fabric 90 and strip 102 then pass together under the grinding station 44 which, functioning as a roll, presses them together while the thermoplastic polymeric resin material resolidifies to bond them to one another. Such a laminate can be the industrial fabric itself. Or, if required, needled batt can be applied to one or more surfaces.

Modifications to the above would be obvious to those of ordinary skill in the art, but would not bring the invention so modified beyond the scope of the appended claims. For example, depending upon the application, it may be desirable to have some piezojets deposit one polymeric resin material while others deposit a different polymeric resin material. Also, while piezojets are disclosed above as being used to deposit the material, in preselected locations on the base substrate, other means for depositing droplets thereof in the size range desired may be known to those of ordinary skill in the art or may be developed in the future, and such other means may be used in the practice of the present invention. The use of such means would not bring the invention, if practiced therewith, beyond the scope of the appended claims.

What is claimed is:
1. A method for manufacturing a papermaker's or industrial fabric, said method comprising the steps of:
   a) providing a base substrate for the fabric having yarns that crossover one another at discrete crossover locations in a woven or nonwoven pattern;
   b) depositing a plurality of polymeric resin material droplets on said base substrate at a plurality of preselected discrete crossover locations in a controlled manner so as to control the lengthwise and widthwise dimensions as well as the amount of polymeric material deposited thereby bonding said yarns together at said discrete crossover locations so as to provide dimensional stability to said fabric; and
   c) at least partially setting said polymeric resin material droplets.

2. A method as claimed in claim 1 wherein said droplets have a nominal diameter of 10μ (10 microns) or more.

3. A method as claimed in claim 1 wherein steps b) and c) are performed sequentially on successive bands extending widthwise across said base substrate.

4. A method as claimed in claim 1 wherein steps b) and c) are performed sequentially on successive strips extending lengthwise around said base substrate.

5. A method as claimed in claim 1 wherein steps b) and c) are performed spirally around said base substrate.

6. A method as claimed in claim 1 wherein said base substrate is woven and in step b), said preselected discrete crossover locations on said base substrate are knuckles formed by said yarns.

7. A method as claimed in claim 1 wherein said base substrate is nonwoven and in step b), said discrete crossover locations on said base substrate are crossover points where crosswise yarns of said base substrate passing over lengthwise yarns or vice versa.

8. A method as claimed in claim 1 wherein said polymeric resin material is deposited in a random or uniform pattern.

9. A method as claimed in claim 1 wherein, in step b), said polymeric resin material is deposited by a piezojet array comprising at least one computer controlled piezojet.

10. A method as claimed in claim 1 wherein step b) comprises the steps of:
    i) checking in real time the surface of said base substrate to locate the desired discrete crossover locations and to cause the deposit thereon of said polymeric resin material.

11. A method as claimed in claim 10 wherein said checking step is performed by a fast pattern recognizer (FPR) processor operating in conjunction with a digital-imaging camera in real time.

12. A method as claimed in claim 11 wherein said depositing step is performed by a piezojet array coupled to said FPR processor.

13. A method as claimed in claim 1, wherein said polymeric resin material is selected from the group consisting of:
    1. hot melts and moisture-cured hot melts;
    2. two-part reactive systems based on urethanes and epoxies;
    3. photopolymer compositions consisting of reactive acrylated monomers and acrylated oligomers derived from urethanes, polyesters, polyethers, and silicones; and
    4. aqueous-based latexes and dispersions and particle-filled formulations including acrylics and polyurethanes.

14. A method as claimed in claim 1 wherein said curing step is performed by exposing said polymeric resin material to a heat source, cold air or actinic acid.

15. A method as claimed in claim 9 wherein said piezojet array comprises a plurality of individual computer-controlled piezojets, and wherein some of said individual computer-controlled piezojets deposit one polymeric resin material while other individual computer-controlled piezojets deposit a different polymeric resin material.

16. A method as claimed in claim 1 further comprising the optional step of abrading said polymeric resin material deposited on said base substrate to provide said polymeric resin material above the surface plane of said base substrate with a uniform thickness.

17. A papermaker's or industrial fabric comprising:
- a base substrate having yarns that crossover one another at discrete crossover locations in a woven or nonwoven pattern; and
- a plurality of discrete dimensionally controlled deposits comprised of one or more polymeric resin material droplets at preselected crossover locations, said dimensionally controlled deposits having widthwise and lengthwise dimensions defined by the controlled placement of said droplets, wherein said polymeric resin material droplets bond said yarns together at said discrete crossover locations so as to provide dimensional stability to said fabric.

18. A papermaker's or industrial fabric as claimed in claim 17 wherein said base substrate is woven from lengthwise and crosswise yarns and wherein said discrete crossover locations are knuckles formed by said yarns.

19. A papermaker's or industrial fabric as claimed in claim 17 wherein said base substrate is nonwoven from lengthwise and crosswise yarns and wherein said discrete crossover locations are crossover points where crosswise yarns pass over lengthwise yarns or vice versa.

20. A method for manufacturing a papermaker's or industrial fabric, said method comprising the steps of:
- a) providing a base substrate for the fabric having yarns that crossover one another at discrete locations in a woven or nonwoven pattern; or includes strips of material wound in adjacent turns where the strips abut one another with a lateral fringe overlap with yarns of an adjacent strip to provide a plurality of discrete locations; or includes an MD or CD yarn array which are to be bonded together at discrete locations,
- b) depositing a plurality of polymeric resin material droplets on said base substrate at a plurality of preselected discrete locations in a controlled manner so as to control the lengthwise and widthwise dimensions as well as the amount of polymeric material deposited thereby bonding said yarns together at said discrete locations so as to provide dimensional stability to said fabric; and
- c) at least partially setting said polymeric resin material droplets.

21. A method for manufacturing a papermaker's or industrial fabric as claimed in claim 20, which further includes the steps of laying a laminate material over the base fabric and bonding it thereto at said discrete locations.

22. A papermaker's or industrial fabric comprising:
- a base substrate having yarns that crossover one another at discrete locations in a woven or nonwoven pattern; or includes strips of material wound in adjacent turns where the strips abut one another with a lateral fringe overlap with yarns of an adjacent strip to provide a plurality of discrete locations; or includes an MD or CD yarn array which are to be bonded together at discrete locations; and
- a plurality of discrete dimensionally controlled deposits comprising one or more polymeric resin material droplets at preselected locations, said dimensionally controlled deposits having widthwise and lengthwise dimensions defined by the controlled placement of said droplets, wherein said polymeric resin material droplets bond said yarns together at said discrete locations so as to provide dimensional stability to said fabric.

23. A papermaker's or industrial fabric as claimed in claim 22 which includes a layer of laminate material bonded to the base fabric at said discrete locations.

* * * * *